United States Patent [19]
Kiendl

[11] Patent Number: 5,826,251
[45] Date of Patent: Oct. 20, 1998

[54] SYSTEM OF CONTROLLING OR MONITORING PROCESSES OR INDUSTRIAL PLANTS EMPLOYING A DUAL-LINE FUZZY UNIT

[76] Inventor: Harro Kiendl, Deipenbecke 16, 58452 Witten, Germany

[21] Appl. No.: 513,987

[22] PCT Filed: Mar. 5, 1995

[86] PCT No.: PCT/EP94/00655

§ 371 Date: Nov. 2, 1995

§ 102(e) Date: Nov. 2, 1995

[87] PCT Pub. No.: WO94/22073

PCT Pub. Date: Sep. 29, 1994

[30]     Foreign Application Priority Data

Mar. 13, 1994 [DE] Germany .......................... 43 08 083.9

[51] Int. Cl.$^6$ .................................................. G06F 15/18
[52] U.S. Cl. .................................. 706/52; 706/8; 706/9
[58] Field of Search .................................. 395/61, 3, 11, 395/900; 364/147; 706/52

[56]              References Cited

U.S. PATENT DOCUMENTS

| | | | |
|---|---|---|---|
| 5,131,071 | 7/1992 | Tsutsumi et al. | 395/3 |
| 5,179,625 | 1/1993 | Hisano | 395/3 |
| 5,255,344 | 10/1993 | Takagi et al. | 395/3 |
| 5,285,376 | 2/1994 | Struger et al. | 364/147 |
| 5,295,226 | 3/1994 | Yamakawa | 395/3 |
| 5,303,331 | 4/1994 | Namba | 395/11 |
| 5,376,611 | 12/1994 | Iwashita et al. | 395/3 |
| 5,408,584 | 4/1995 | Hirakura et al. | 395/3 |
| 5,425,131 | 6/1995 | Basehore | 395/3 |
| 5,495,574 | 2/1996 | Miyazawa et al. | 395/3 |
| 5,600,757 | 2/1997 | Yamamoto et al. | 395/3 |

OTHER PUBLICATIONS

Zhang et al; IEEE Int. Conf. on Neural Networks, ICNN 1988, pp. I–231–I–238.
Patent Abstracts of Japan, vol. 16, No. 186 (p–1347) dated May 17, 1992.
Kacprzyk et al; 3rd Int. Conf. on Information Processing and Management of Uncertainty in Knowledge–Based Systems, IPMU 1990, pp. 424–430.
Pfluger et al; IEEE Int. Conf. on Fuzzy Systems, ICFS 1992, pp. 717–723.

*Primary Examiner*—Tariq R. Hafiz
*Assistant Examiner*—Sanjiv Shah
*Attorney, Agent, or Firm*—Banner & Witcoff, Ltd.

[57]             ABSTRACT

A dual-line system of controlling or monitoring processes or industrial plants employing a dual-line fuzzy unit is presented in which due allowance can be made for both positive and negative rules. These are rules issuing "positive recommendations" and "warnings" or "prohibitions" for the selection of the values of the output variables for the fuzzy unit. The dual-line system enables logical compromises to be made between these "recommendations" and "warnings" or "prohibitions". Along with the possibility of drawing on positive empirical knowledge, use of this dual-line system also creates the possibility of utilizing negative empirical knowledge with the same degree of transparency with which positive empirical knowledge has previously been used in conventional fuzzy units. The warnings serve to protect the plant or resources or to prevent undesirable control behavior. The inclusion of warnings or, more especially, prohibitions is also of interest for warranties of operational reliability.

27 Claims, 3 Drawing Sheets

SYSTEM OF CONTROLLING OR MONITORING PROCESSES OR INDUSTRIAL PLANTS EMPLOYING A DUAL-LINE FUZZY UNIT

CROSS REFERENCES TO RELATED APPLICATIONS

German Patent 43 08 083 Kiendi 1994 (Verfahren zur Erzeugung von Stellgrößen am Ausgang eines Fuzzy-Reglers und Fuzzy-Regler hierfür)

BACKGROUND OF THE INVENTION

1. Field of the Invention

The invention relates to a system of regulating or monitoring processes or industrial plants by generating an unambiguous scalar value of an output variable u or an unambiguous vector u of output variables at the output of a fuzzy unit as a function of the value of an input variable e or the values of several input variables combined to form a vector e, a fuzzy unit for implementing the said system and beneficial applications of the said system. The description that follows is based on fuzzy units revealing only one input variable e and one output variable u. The subject of the invention can, however, be applied analogously to fuzzy units revealing several input and several output variables.

2. Description of the Related Art

Figure 3:
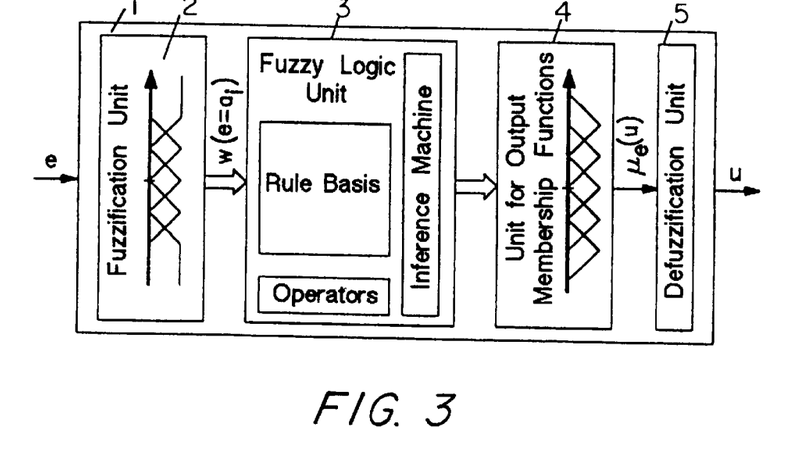
FIG. 3 is a block diagram of a conventional fuzzy system.

Signal-processing fuzzy units are familiar for instance in the for of fuzzy controllers. Their method of functioning is established, for exaple, in the article "Fuzzy Control" by H. Kiendl and M. Fritsch, in at Autoatisierungstechnik 41 (1993) 2, pp. A 5–A8 and can be described with the aid of FIG. 3 as follows: The controller input variable e is conducted to the fuzzification module 1. By means of the membership functions 2 on the input side, this module establishes for each of the linguistic values $a_i$, e.g. "vanishing", "positively small" and "positively large" as applied to input variable e, the degree to which it is allocated to a currently applied value of input variable e. These values, also referred to as truth values $w(e=a_i)$ of the linguistic statements $e=a_i$ are conducted to a fuzzy logic module 3 containing linguistic rules, combined to form a rule basis fuzzy operators and an inference machine. Proceeding from these truth values, the logic operators assist in establishing to what degree the premises of the rules are fulfilled. The outcome of this determines the conclusions of the inference machine and—by means of the membership functions 4 on the output side—a resulting membership function $\mu_c(u)$. This function indicates for each value of the output variable u to what degree this is "favourable", i.e. recommended to serve as an output variable value as based on the conclusions of all rules. This membership function $\mu_c(u)$ is conducted to a defuzzification module 5. This then determines—for example employing the familiar center of gravity method—a resulting unambiguous value of the output variable u.

The method of functioning of conventional fuzzy controllers is also described in H. -P. Preuß's article "Fuzzy Control—heuristische Regelung mittels unscharfer Logik", atp Automatisierungstechnische Praxis 1992, 4 pp. 176–184 and 5, pp. 239–246. The internal makeup of a fuzzy controller described in this article on the basis of FIG. 12 and 13 (q.v.) corresponds fully to the structure depicted in FIG. 3 of this patent application. Differences occur only as a result of the terminology and graphic layout. Thus, in FIG. 3, the output variables of the fuzzification unit, which are truth values in conformity with Preuß's article (q.v., p. 240, left-hand column, sentence 1) are designated $w(e=a_i)$ for the purposes of illustration. Furthermore, in FIG. 3, the function of processing the various rules (Preuß=inference) as well as that of combining the conclusion of all rules (Preuß= composition) are incorporated in the fuzzy logic function module. Likewise in FIG. 3, the membership function to be defuzzified, which results on the output side from the combined interaction of all rules, is indicated by use of the symbol $\mu_c(u)$. This designation is absent in FIGS. 12 and 13 of Preuß's article. Nevertheless, this function is highlighted in the right-hand illustration section of FIG. 12 of the article by being underscored in black. Finally, in FIG. 3, the "module for membership functions on the output side" likewise required by Preuß, although not drawn separately there, is nevertheless identified as a separate block. This goes to show that the state of the art illustrated in FIG. 3, from which this invention proceeds, is covered by Preuß's article.

Conventional signal-processing fuzzy modules of this type reveal the following drawback: No guarantee can be given that the value of the output variable u lies outside certain "prohibited ranges"—generally or under certain conditions. Avoidance of such prohibited ranges can be desirable for example if the output variable u of a fuzzy controller acts upon an actuator consisting of several units that are switched on or off depending on the absolute value of u. Interest is then focused on reducing the frequency of the on/off switching action. In that case, all values of u will be "unfavourable" or "prohibited" that are situated in the vicinity of the switchover thresholds. Another example frequently encountered is that systems engineering often requires a guarantee that in certain situations a valve will be closed to the full extent, i.e. completely and not "almost". This means that in these situations all valve positions except the "closed" position are prohibited.

Figures 2A, 2B:
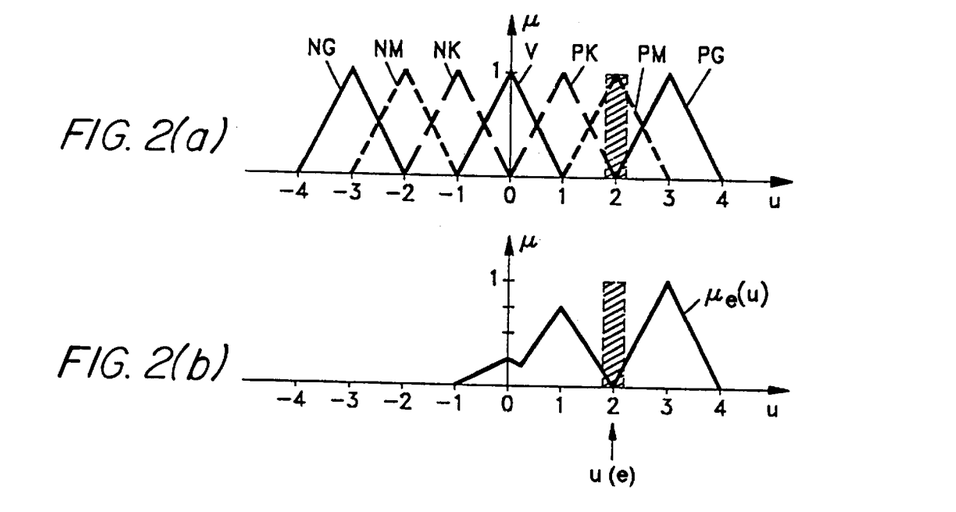
FIG. 2 illustrates a situation where a conventional fuzzy system fails to process a prohibition properly.

In the explanations that follow, reasons are given as to why such prohibitions cannot be maintained with certainty employing conventional fuzzy controllers. Here, the linguistic values "negatively large", "negatively mean", "negatively small", "vanishing", "positively small", "positively mean" and "positively large" are planned for the output variables u of the fuzzy controller. From now on, these will be referred to in their abbreviated form as NL, NM, NS, V, PS, PM and PL. The links between these linguistic values and the real numerical values of the variable u are established by means of the membership functions in accordance with FIG. 2a. The two cases are now to be considered according to which the value range $1.8 \leq u \leq 2.2$ applicable to the output variable u are to be prohibited in general (stipulation 1) or under certain conditions (stipulation 2). To meet these requirements it is possible, of course, to remove all rules from the rule basis pertaining to stipulation 1 in whose conclusions the term "u=positively mean" occurs and, as regards stipulation 2, all rules whose premises are fulfilled where the said prior conditions are met. In this way, it may be possible for the fuzzy controller to generate a membership function $\mu_c(u)$ which assumes only negligible functional values in the prohibited values range (FIG. 2b). Even so, defuzzification of this membership function may result in a value u(e) lying within the prohibited values range. Thus, the outcome of defuzzification of the membership function $\mu_c(u)$ depicted in FIG. 2b according to the familiar centre of gravity method just happens to be value u(e)=2 which is situated in the middle of the prohibited range.

The main underlying cause of the drawback set out above encountered with conventional single-line signal-processing fuzzy units is as follows: in conventional type fuzzy units all values of the output variable that more or less meet the conclusions of the rules are treated as "favourable", i.e. as positive "recommendations", while the degree of recommendation depends on the degree to which the conclusion is met as well as the degree to which the premises of the rules are fulfilled. Values of output variables failing to meet the conclusion of a rule, either completely or to a slightly lesser degree, are not treated as "prohibitions" or more or less severe "warnings", but rather as "non-recommendations". This explains why values of output variables not recommended by a certain rule may nevertheless still emerge on the output side. The cause may be attributed to the action mechanism of known defuzzification procedures (FIG. 2$b$) or to the action mechanism of known inference strategies not providing any means for preventing the "non-recommendation" of a rule from being "superimposed" by recommendations of other rules. As established above, strict adherence to prohibitions may be desirable in practical applications.

The same disadvantage is revealed in the dual-line fuzzy controller familiar from Komori Kumiharo's publication "Fuzzy Control Method", Patent Abstracts of Japan, Publication Number JP4023004, 1992. The two lines act upon a plant (e.g. a system engineering process) via a pulse-width modulation (PWM), while the first line exercises influence on the output variable of the plant in the positive direction (e.g. temperature increase) and the second line affects the output variable of the plant in the negative direction (e.g. temperature decrease). Both lines are designed as conventional single-line fuzzy controllers, i.e. they each have a fuzzification unit, a fuzzy logic unit and a defuzzification unit. The output variable $f_1$ of the first line is formed by defuzzification of the membership function $\mu_1(f)$ generated by the first line and acts in the positive direction. The output variable $f_2$ of the second line is formed by defuzzification of the membership function $\mu_2(f)$ generated by that line and acts in the negative direction. Thus, a typical feature in the structural makeup of this type of controller is that the membership function $\mu_1(f)$ produced by the first line provides recommendations for the positive action directions and that the membership function generated by the second line $\mu_2(f)$ supplies recommendations for the negative action directions. No allowance is made in particular for warnings or prohibitions as applied to positive and negative action directions. Accordingly, no offsetting of recommendations and warnings takes place in respect of positive and negative action directions either.

Considering the invention from the technical angle, attention is drawn to the article by W. Zhang and S. Chen: "A Logical Architecture for Cognitive Maps", IEEE Int. Conf. of Neural Networks, ICNN 1988, pp. I-231-I-238. This article deals with cognitive networks formed from discrete nodes and connections. Pairs of values are allocated to the connections making it possible to express the extent to which a node exercises a positive (supportive) influence on another node and on to what extent it has a negative (inhibitory) effect on the node. The article describes a system in which it is possible to pool information contained in such a network: thus the resulting positive and negative effects a node i exercises on a node j can be determined, taking into account all paths along which it is possible to access from node i to node j. If this system is applied to a network in which certain nodes are defined as input nodes and others as output nodes, it is possible to determine the extent to which each input node supports or inhibits each of the output nodes. However, this does not yet produce any unambiguous output variable values in relation to given input variable values as called for in the above-mentioned task. The process of generating output variable values necessitates appropriate offsetting of supporting and inhibitory factors. Even when applying this additional measure, which is not provided for in the system, it would—as with the familiar expert systems—only be possible to generate output variable values for discrete input variable values from a spectrum of discrete alternatives and not, as in the present task, from a continuum of possible values. This system is in so far unsuitable for solving the task in hand. Apart from that, the system processes expert knowledge which is decentrally deposited in a network and not in the form of rules as is called for in the present task.

SUMMARY OF THE INVENTION

The task is to propose a system of controlling or monitoring processes or industrial plants by generating an unambiguous output variable value obtained from a continuum of possible values at the output of a fuzzy unit in which at least one rule offers positive action proposals for selecting a value of an output variable u ("recommendations") and at least one other rule prohibits certain values of output variables or issues a more or less severe warning ("warnings" or "prohibitions") against using these values, allowance also being made for such recommendations or warnings/prohibitions to resort to a compromise when generating the value of the output variable.

With a dual-line system of controlling or monitoring processes or industrial plants employing a dual-line fuzzy unit, due allowance can be made for both positive and negative rules. These are rules issuing "positive recommendations" and "warnings" or "prohibitions" for the selection of the values of the output variables for the fuzzy unit. The dual-line system enables logical compromises to be made between these "recommendations" and "warnings" or "prohibitions". Along with the possibility of drawing on positive empirical knowledge, use of this dual-line system now also creates the possibility of utilising negative empirical knowledge with the same degree of transparency with which positive empirical knowledge has previously been used in conventional fuzzy units. As far as practical applications are concerned, this caters for the possibility of including warnings which serve to protect the plant or resources or to prevent undesirable control behaviour. The inclusion of warnings or, more especially, prohibitions is also of interest for warranties of operational reliability.

The invention-based system in accordance with claim 1 solves the above described task. Further developments of the invention-based system, an invention-based fuzzy unit for implementing the said system and beneficial applications of the said system form the subject of claims 2 to 28.

DESCRIPTION OF THE PREFERRED EMBODIMENTS

Figure 1:
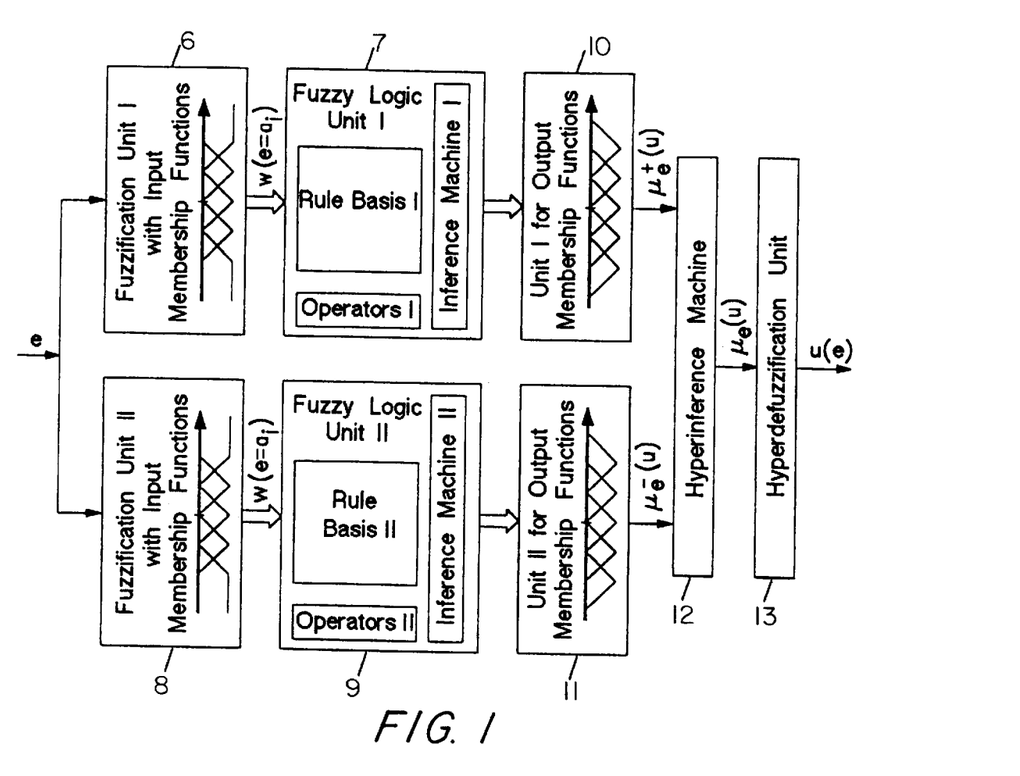
FIG. 1 is a block diagram of the claimed dual-line fuzzy system.

The invention is described below on the basis of a standard design example shown in FIG. 1. In the new type of structure illustrated here, the fuzzy unit is designed as a dual-line version. The first line contains a fuzzification module 6 and a fuzzy logic module 7; the second line contains a fuzzification module 8 and a fuzzy logic module 9. Fuzzy logic module 7 contains a set of rules defined as rule basis I which provide "recommendations", i.e. define certain values of the output variable u as being "favourable". Fuzzy logic module 9 contains a set of rules, defined as rule basis II, which issue "warnings", i. e. define certain values of the output variable u as being "unfavourable". In addition to these sets of rules, fuzzy logic modules 7 and 9 contain fuzzy operators I and II respectively—as well as inference machines I and II respectively. The output of inference machine I is offset by means of a module 10 for membership functions on the output side to form a membership function $\mu_c^+(u)$. Its functional values indicate for each value of the output variable u the degree to which that value is "favourable" on the basis of the conclusions of fuzzy logic module 7, i.e. is recommended. The output of fuzzy logic module 9 is offset by means of a module 11 for membership functions on the output side to form a membership function $\mu_c^-(u)$. The functional values of this membership function indicate for each value of the output variable u of the fuzzy unit the degree to which that value is "unfavourable" on the basis of the conclusions of fuzzy logic module 9, i.e. to what extent a warning is issued against its use. In the two logic modules I and II fuzzy operators and inference strategies differing from one another may be used, for example in logic module II the familiar SUM-PROD-inference or the Einstein sum for enhanced superimposition of mild warnings. The two membership functions $\mu_c^+(u)$ and $\mu_c^-(u)$ are conducted in direct form or transformed state to a hyperinference machine 12. This applies a hyperinference strategy to determine a resulting membership function $\mu_c(u)$, the functional values of which represent a practical compromise between the "recommendations" of fuzzy logic module 7 and the "warnings" of fuzzy logic module 9. Various hyperinference strategies are presented below which enable recommendations and warnings to be offset against one another in a varying and practical manner.

Figure 4A:
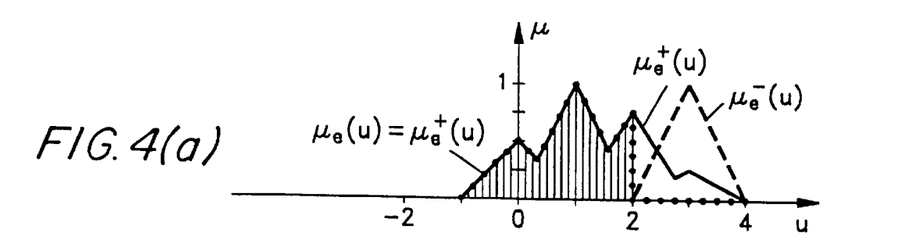
FIG. 4 illustrates different hyperinference strategies 1, 2 and 3 (*a, b* and *c* respectively)
Figure 4B:
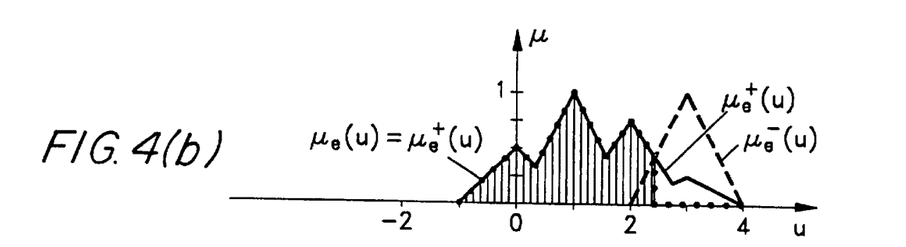
Figure 4C:
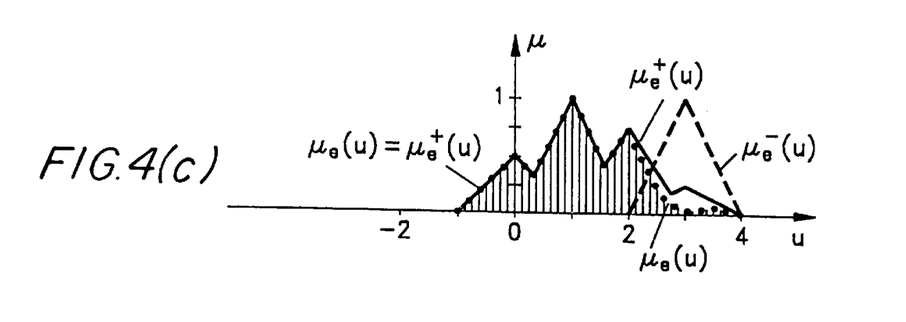

According to hyperinference strategy 1 (claim 3) it is determined in respect of all values u with $\mu_c^-(u)=0$, that $\mu_c(u)=\mu_c^+(u)$; otherwise $\mu_c(u)=0$ (FIG. 4a). This strategy is based on the heuristics that the output variable u of the fuzzy unit should not be capable of accepting values defined as "unfavourable" by fuzzy logic module 9, even if this is only to the slightest degree. According to hyperinference strategy 2 (claim 4) it is determined in respect of all values u with $\mu_c^+(u) \geq \mu_c^-(u)$ that $\mu_c(u)=\mu_c^+(u)$; otherwise $\mu_c(u)=0$ (FIG. 4b). This strategy is based on the heuristics that the output variable u of the fuzzy unit should only be capable of accepting values which are defined by fuzzy logic module 7 as being "favourable" to a greater degree than they are determined by fuzzy logic module 9 to be "unfavourable". Hyperinference strategy 3 (claim 5) proceeds from the formation of the difference for the classical sets A and B: The characteristic function $\mu_{A-B}(x)$ of the difference set A–B assumes the functional value of 1 precisely for all elements x to which $\mu_A(x)=1$ and $\mu_B(x)=0$, while $\mu_A(x)$ and $\mu_B(x)$ are the characteristic functions of sets A and B. Hyperinference strategy 3 is based on the idea of transferring this difference to fuzzy operators. This results in rule $\mu_c(u)=\mu_c^+(u) \hat{\ } ]$ $\mu_c^-(u)$. For their evaluation, the functional values of membership functions $\mu_c^+(u)$ and $\mu_c^-(u)$ are employed and linked to the rules of calculation defined for fuzzy operators "^" and "]". As the fuzzy operators "^" and "]" have varying definitions, this will result in a corresponding number of variants of hyperinference strategy 3 being obtained. They are distinguished in that the membership functions $\mu_c^+(u)$ and $\mu_c^-(u)$ are offset to form a resulting membership function $\mu_c(u)$ based on an optional compromise between the "recommendations" in rule basis 7 and the "warnings" given in rule basis 9. FIG. 4 c contains an example. Hyperinference strategies 1, 2 and 3 are heuristically plausible and ought to satisfy practical requirements to a large extent. In special cases more general hyperinference strategies may be applied. Each function $\mu_c(u)=f(\mu_c^+(u), \mu_c^-(u))$ with the properties $f(\mu,0)=\mu$ and $f(\mu,1)=0$ as well as $f(\mu_1,\mu_2) \leq f(\mu_1,\mu_3)$ for $\mu_2 \geq \mu_3$ may serve as a generalised hyperinference strategy of this kind (claim 6).

Figure 5:
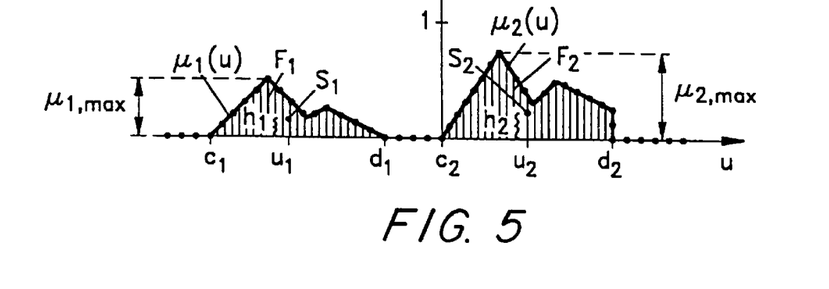
FIG. 5 illustrates different strategy elements of hyperdefuzzification procedures.

The resulting membership function $\mu_c(u)$ is finally conducted in direct form or transformed state to the hyperdefuzzification module 13. This module determines an unambiguous value u(e) in accordance with a hyperdefuzzification strategy formed from $\mu_c(u)$. The first step of the preferred hyperdefuzzification strategies 1 and 2 consists of generating partial functions $\mu_1(u), \mu_2(u), ---, \mu_r(u)$ from the membership function $\mu_c(u)$ in accordance with rule $\mu_i(u)=\mu_c(u)$ in respect of u $\in [c_i, d_i]$ and $\mu_i(u)=0$ for u $\notin [c_i, d_i]$, while the intervals $[c_i, d_i]$ are formed according to the rule that the function $\mu_c(u)$ assumes a preselected value $p_i \geq 0$ at interval limits $c_i$ and di, and greater values within the interval. FIG. 5 shows an example containing two resulting partial functions in respect of $p=p_2=0$. Each partial function $\mu_i(u)$ for instance is defuzzified separately in accordance with the centre of gravity method. In this way r values $u_i$ differing from one another are obtained. Allocated to each value $u_i$ is a weighting factor g. According to hyperdefuzzification strategy 1 (claim 10), the final unambiguous value of the output variable u(e) selected from among values $u_i$ is the one which has the greatest weighting factor g. Where maximum weighting factors $g_j$ of equal size result, an unambiguous value u is determined by a random-event generator or by including additional aspects. With another version of hyperdefuzzification strategy 1, the weighting factor $g_j$ used is the area $F_i$ below the functional graphs of partial function $\mu_r(u)$, namely, in the interval in which the partial function has positive values. With other versions of hyperdefuzzification strategy 1, the weighting factor $g_j$ is formed as a function of $F_i$ or as a function of the height $h_i$ of the centre of gravity of area $F_i$ across the axis belonging to value $\mu=0$, or of the maximum functional value $\mu_{i,max.}$ of the function $\mu_i(u)$ or as a function of the widths $b_{i,L}$ and $b_{i,R}$ of intervals $[_id, _{i+1}c]$ and $[_{i+1}d,]$ left or right of the interval $[c_i, d_i]$ in which $\mu_i(u)=0$, or as a function of several of the variables $F_i, h_i, \mu_{i,max.}$ and $b_{i,L}$ as well as $b_{i,R}$ (cf. FIG. 5). The resulting value of the weighting factor $g_i$ increases proportionately with the values of $F_i, h_i, \mu_{i,max.}$ and $b_{i,L}$ or $b_{i,R}$. A practical possibility of forming the weighting factor $g_i$ is provided for example by the rule $g_i=F_i ((d_i-c_i+0.5 \ b_{i,L}+0.5 \ b_{iR})/(d_i-c_i))$. This ensures for example that, where there is a prohibition all values u with $\in \leq |u| \leq u_1$ with a small value $\in$, the output variable of the fuzzy unit is in fact capable of accepting the permitted value u=0.

According to hyperdefuzzification strategy 2 (claim 12), the value $u_j$, is first determined to which the largest weighting factor has been allocated. From this, the final value u(e) is formed by shifting $u_j$ within the interval $[c_j, d_j]$. This shift process satisfies the rule $u(e)=\mu_j+\mu_j$ with $c_j \leq u_j+\Delta_j \leq d_j$, i.e. the resulting value u(e) is still located within the interval $[c_j,$ $d_j$]. For example, in accordance with $\Delta_j = \Sigma \Delta_{ji}$ the shift $\Delta_j$ is composed of partial amounts $\Delta_{ji}$ with $i \neq j$ whose prefix signs correspond to the prefix sign of $u_i-u_j$ and whose absolute values increase as $g_i$, $F_i$, $h_i$ and $u_{i,max}$ rise in value, and whose absolute values decrease as the values of $g_j$, $F_j$, $h_j$ and $\mu_{j,max}$ and $|u_i-u_j|$ increase. Another possibility of this shift is that it is dependent solely or additionally on the values $c_j$, $\mu(c_j)$, $d_j$ and $u(_jd)$ and that, for example, the final value $u(e)$ is formed with $\mu^*=(1-\mu(c_j))(1-\mu(d_j))$ applying the rule $u(e) = (\mu(c_j)c_j + \mu^* u_j + \mu(d_j)d_j)/(\mu(c_j)+\mu^*+\mu(d_j))$. This rule ensures that the value $u(e)$ continues to be shifted more to one of the marginal points of the interval $[c_j, d_j]$ as the values of the membership function $\mu(u)$ increase there. This is meaningful when the prohibition affecting the values to the left and right of this interval is not to have any "remote effect" in the sense that even those values situated within the interval in close proximity to the interval limits $c_j$, and $d_j$ are also to be considered as critical.

Hyperdefuzzification strategy 3 (claim 14) differs from the others previously specified in that, instead of the membership functions $\mu_c^+(u)$ and $\mu_c^-(e)$ or $_cu(u)$, the functions obtained from these as a result of transformation, i. e. functions $\bar{\mu}_c^+(u)=k+(\mu_c^+(u))$ and $\bar{\mu}_c^-(u)=k^-(\mu_c^-(u))$ or $\bar{\mu}_c(u)=k(\mu_c(u))$ are conducted to the hyperinference module or the hyperdefuzzification module for further processing, while the functions $\bar{\mu}^+=k^+(\mu), \bar{\mu}^-=k^-(\mu)$ and $\bar{\mu}=k(\mu)$ are preferably monotonically rising functions for $\mu \geq 0$ which assume functional value 0 in $\mu=0$ and functional value 1 in $\mu=1$ as is, for example, the case involving function $\bar{\mu}(\mu)=\mu^a$ for each a>0 or for function $\bar{\mu}(\mu)=(e^{\lambda\mu}-1)/(e^\lambda-1)$ for each $\lambda \neq 0$. In this way, a gradual compromise can be ensured specifically between the "recommendations" given in rule basis I and the "warnings" issued in rule basis II. An alternative possibility of attaining this objective is that of selecting functions $\bar{\mu}_c^+=k^+(\mu)$, $\bar{\mu}_c^-=k^-(\mu)$ and $\bar{\mu}_c=k(\mu)$ in such a way that they assume value 1 in a finite value u or only asymptotically. In particular for processing the positive and negative rules this provides the possibility of utilising inference strategies, such as the SUM-PROD-inference which supply non-standardised membership functions as results and which could not be suitable processed by the hyperinference strategy without restriction to the maximum functional value 1. The use of the SUM-PROD-inference is partiucларly interesting for processing negative rules as it is thus possible to superimpose several mild warnings so as to form a severe warning or a strict prohibition. The same objective can be attained without any subsequent standardisation being necessary by superimposing the membership functions provided by the individual rules $R_i$ and $R_j$, i.e. membership functions $\mu_i(u)$ and $\mu_j(u)$ according to the rule $\mu_c^-(u)=(\mu_i(u)+\mu_j(u))/(1+\mu_i^-(u)\mu_j^-(u))$ known as the Einstein sum.

If hyperinference strategy 1 is selected for the new structure of the fuzzy unit presented here, together with one of the hyperdefuzzification strategies described, it is guaranteed that the value of the output variable u of the fuzzy unit will definitely not assume any value defined by fuzzy logic module 9 as being "unfavourable", even with the slightest positive degree. In addition, the different hyperdefuzzification strategies provide varying possibilities for quantifying the effect of the fuzzy unit. Applying one of the other hyperinference strategies enables a variable and less rigid compromise to be made between the "recommendations" of fuzzy logic module 7 and the "warnings" of fuzzy logic module 9.

The main applications of the described fuzzy unit are controlling and monitoring processes or industrial plants.

When the new dual-line fuzzy unit is used as a fuzzy controller the output variable u influences a downstream system or a downstream actuator. The dual-line fuzzy unit can also be employed as a member or component of a more complex control or monitoring facility, e.g. for processing measured values. Its output variables can be used to influence downstream structural components. An extension to the new dual-phase fuzzy signal processing system makes it possible additionally or exclusively to utilise the membership function $\mu_c(u)$ to influence downstream structural components (claim 2).

As tests have shown, the invention-based system can be implemented by means of fuzzy units containing standard microprocessors and memory modules, and in which the system is processed by software. A subprogram is realised for each of the fuzzification modules I (6) and II (8), fuzzy logic modules I (7) and II (9), modules I (10) and II (11) for membership functions on the output side, the hyperinference machine (12) and the hyperdefuzzification module (13). Instead of the specified software component implementation, these components can also be constructed as hardware units in the form of electrical, electronic or optical components as special fuzzy chips designed as artificial neural networks, customised circuits, discrete circuitry or analog circuitry. In all these cases, dual-line designing principles makes it possible to effect system implementation in both lines on parallel principles, thus bringing about a saving of time (claims 16 and 17).

A most simple way of constructing a fuzzy unit for system implementation is to utilise one conventional type single-line fuzzy unit for determining the membership functions $\mu^+_c(u)$ by processing the positive rules and another for determining the membership functions $\mu^-_c(u)$ by processing the negative rules, and to employ special modules only for determining the membership function $\mu_c(u)$ and for hyperdefuzzification, these modules being constructed of electrical, electronic or optical components, preferably in the form of standard microprocessors and memory modules or special fuzzy chips, artificial neural networks, customised circuits, discrete circuitry or analog circuitry (claim 18).

Figure 6:
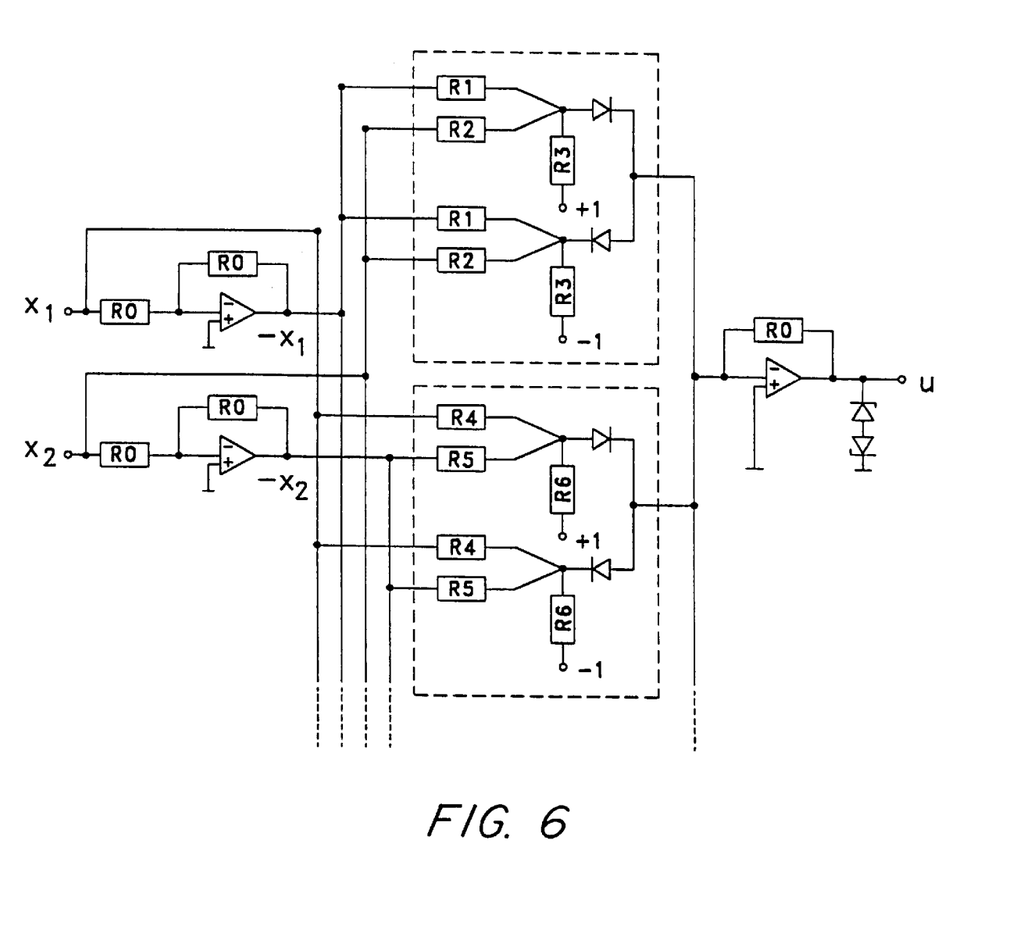
FIG. 6 is a block diagramm of an electronic circuit which can be used to realize the key-field of a fuzzy system.

With a view towards real-time realisation of an invention-based dual-line fuzzy control system, the following possibility is of particular interest: First of all a dual-line fuzzy unit is designed which solves the set problem. A table of values is then compiled which, for example with a fuzzy controller with the two input variables $x_1$ and $x_2$ and the output variable u for a number of grid points $(x_1, x_2)$ of the $x_1$-$x_2$ space, indicates the size of the resulting values $u(x_1, x_2)$ of the fuzzy controller's output variable in respect of those points. Following this, a non-linear function, e.g. in the form of a polynominal or piece-for-piece affine facet functions, is applied with parameters still available; these free parameters are set in such a way that the non-linear function provides approximately the same values u for the grid points of the $x_1$-$x_2$ space as those contained in the table of values. This process is begun by effecting a random setting of the parameter values for the facet functions and determining in respect of these to what extent deviations occur between the functional values supplied by the functional statement and contained in the table of values. By varying the parameter values of the functional statement progressively and applying a gradient process, these deviations are then gradually reduced. In this way, parameter values are finally achieved which impart approximately the same pattern of behaviour to the non-linear function which is possessed by the previously designed dual-line fuzzy controller. The outcome is the parameter values in respect of a non-linear key field controller which can be realised on the hardware side with considerably less outlay than the original fuzzy controller and which speeds up processing of the system, thus making it especially suitable for controlling fast processes (claim 19). If the pattern of behaviour of the dual-line fuzzy unit is specifically approximated by a piece-for-piece affine facet function, realisation of this is possible by means of an analog circuit consisting only of operation amplifiers, diodes and resistors (claim 20). FIG. 6 illustrates an example. (Cf. H. Kiendl: Suboptimaler Regler mit abschrittsweise linearer Struktur. Lecture Notes in Economics and Mathematical Systems. Springer Verlag Berlin Heidelberg New York 1972, p. 133 ff.)

Standard potential applications of the dual-line fuzzy signal processing technique are set forth below.

Introduction of a dead zone for the actuating variable (claim 21): In traditional automatic control engineering it is known that preventing the controller from reacting to minor deviations can prove to be practical for calming or steadying system behaviour. For this purpose, a dead zone is created by means of a unidimensional characteristic element. With a dual-line fuzzy controller this concept can also be transferred to fuzzy controllers with several input variables. A prohibitive rule is introduced for this purpose. When the steady position is approached, this forbids all actuating variable values u situated in the vicinity of the value $u_R$ of the actuating variable which can just hold the system in the steady position. A dead zone of this kind is also purposeful for controlling mechatronic systems with static friction as this prevents the system from being acted upon by values of actuating variables that are too small to overcome such static friction and which thus act as a strain on the system without moving it.

Prohibited band for actuating variable (claim 22): Frequently a multistage actuator is connected downstream from a controller, whereby in cases in which actuating-variable requirements are negligible only the first stage is switched on, and the second stage and further stages are switched on in addition to correspond to increased requirements etc. In the interests of protecting the actuator, switching the stages on and off frequently is to be avoided. This can be accomplished by applying prohibitive rules which ban all values of output variables of the controller in the proximity of the switchover thresholds.

Protection of the actuator or system (claim 23): In general, strain is imposed on an actuator or system by actuating-variable output; for example a motor heats up in operation. For that reason, when designing a control circuit it is advisable to pay attention not only to the control performance itself, but also to strain on the actuators or the system. This can be achieved by applying prohibitive rules. For this purpose, an indicator is first obtained in respect of such strain, for example by measuring the temperature of a motor or by time-weighted integration of the actuating variable values previously generated by the actuator. A prohibitive rule is then introduced into the controller which warns against output-variable values u for the controller or places a strict ban on these if they impose considerable or unacceptable further strain on the actuator or system.

Positional control: In the case of positional control applications, e.g. with the aid of a robot, it may for safety reasons prove advisable to prohibit high approach speeds after the desired target position has almost been reached. This can be done by applying a corresponding prohibitive rule.

Pulse-frequency modulation (claim 24): There are certain applications in which the value u supplied by the controller is converted to a pulse train. In the event of such a pulse train affecting a downstream system, this may cause undesirable vibrations to occur on certain pulse frequencies. This can be avoided by applying prohibitive rules which prohibit all values u giving rise to critical pulse frequencies.

Vibration absorption (claim 25): Off line determination is carried out, e.g. by conducting an eigenvalue analysis or by means of experiments, to ascertain the undesirable vibrations which may occur in the control system and the frequencies these vibrations have. A correlation analysis of the input and output variable patterns of the system, for example, is then used to determine for each potential value u of the actuating variable currently due to be administered the extent to which this value causes an increase in vibrational excitation in connection with the history of the actuating variable hitherto administered. A prohibitive rule is then established which increases its warnings against the use of a value u as the degree of excitation rises. In this way, such actuating-variable values u which cause undesirable vibrational excitation are avoided.

Fuzzy supervision (claim 26): One of the functions of fuzzy supervision consists of applying fuzzy rules that result from observing the dynamic behaviour of processes to indicate the presence of process conditions u, knowledge of which is of relevance for monitoring or supervising processes or systems or for taking action at higher process control level, e.g. by unleashing alarms. If, in addition to positive rules, negative rules are also used, this can enhance selectivity in detecting such process conditions. In that case, it is not only possible to introduce criteria into the rule basis with regard to the prevailing degree of such process conditions, but also with regard to the extent to which they are not present. The invention-based fuzzy process in this practical example is thus primarily intended for monitoring or supervision purposes.

Fuzzy quality measure (claim 27): Another function of fuzzy supervision is that of quality rating as applied to the behaviour of complex processes. For this purpose, it is necessary to combine the ratings of partial aspects so as to form an aggregate quality while also making due allowance for positive and negative partial ratings. In certain circumstances therefore an overall evaluation may be negative, even though certain partial evaluations are highly positive. This type of overall evaluation is possible with a dual-line fuzzy unit: the positive and negative rules can provide the degree of suitablility or unsuitability for any potential aggregate quality on the basis of an evaluation scale. These recommendations and warnings are offset by hyperinference and hyperdefuzzification to form a final aggregate quality result. Here too, this primarily involves application for (quality) supervision of processes or industrial plants.

Fuzzy measuring system (claim 28): Measuring signals delivered by a sensor frequently call for intelligent modification for further processing. For this purpose, the current measured value needs to be compared with previous measured values obtained more recently and modified on a logical context-related basis. One example is that relating to temperature-controlled egg incubators of which it is known that briefly opening the door for the purpose of removing eggs causes a temperature reduction to occur which, while not being detrimental in principle, nevertheless leads to an undesirable thermostat reaction: after the door is closed the temperature often increases to such an extent that the eggs are exposed to risk. Such problems can be solved by conducting current and previously measured values to a dual-line fuzzy unit and applying positive and negative rules to determine, in respect of each potential value u of the measurable variable, the extent to which it is to be considered as supported or discarded by the previous measured values. By means of hyperinference and hyperdefuzzification, the value is then generated that is deemed to be the most advisable in the context of the application. In the example relating to the incubator, the abrupt drop in temperature recorded by the measuring device will, for instance, cease to appear at the output of the fuzzy unit: the unit only recognises this as being a fall in temperature to which the conventional downstream thermostat is not supposed to react.

I claim:

1. System of controlling or monitoring processes or industrial plants achieved by generating an unambiguous scalar value of an output variable u or values of output variable $u_1, u_2, \ldots, u_s$ at the output of a fuzzy unit, in which each of the output values comes from a continuum of possible values and the output variables are generated as a function of the value of an input variable e or of the values of several input variables $e_1, e_2, \ldots, e_r$, from at least one sensor of said controlled or monitored processes or industrial plants, subsequently combined to form a vector e for each output variable $u_i$, by means of two parallel processing lines, each containing the sections fuzzification, conclusion in accordance with a rule basis assisted by fuzzy logic and creation of a membership function on the output side, characterized in that, in the case of a scalar output variable u, the first processing line generates a membership function $\mu_c^+(u)$ on the basis of conclusions assisted by a first set of rules (rule basis I), the functional values of the said membership function indicating, in respect of each potential value of the output variable, how far the first set of rules (rule basis I) on the whole recommends the said value of the output variable, further characterized in that the second processing line generates a membership function $\mu_c^-(u)$ on the basis of conclusions assisted by a second set of rules (rule basis II), the functional values of the said membership function indicating, in respect of each potential value of the output variable, how far the second set of rules (rule basis II) on the whole warns against use of the said value of the output variable, further that a resulting membership function $\mu_c(u)$ is generated from membership functions $\mu_c^+(u)$ and $\mu_c^-(u)$ assisted by a hyperinference procedure (12) which makes a compromise between the recommendations and warnings; in addition, that an unambiguous output value u(e) is generated from the membership function $\mu_c(u)$ assisted by a hyper-defuzzification procedure (13); in addition, that, in case of several output variables $u_1, u_2, \ldots, u_s$, the system described above in respect of one output variable is applied for each individual output variable $u_1, u_2, \ldots, u_s$ still further characterized in that the hyperinference procedure functions in accordance with a rule corresponding to the form $\mu_c(u)=f(\mu_c^+(u), \mu_c^-(u))$, while at the same time the function f possesses the three properties $f(\mu,0)=\mu$ and $f(\mu,1)=0$ as well as $f(\mu_1 \text{ and } \mu_2) \leq f(\mu_1 \text{ and } \mu_3)$ for $\mu_2 \geq \mu_3$, the first effect of this rule being that the resulting membership function $\mu_c(u)$ is identical to the membership function $\mu_c^+(u)$ in respect of the values of u for which the membership function $\mu_c^-(u)$ assumes the functional value of 0, which means that none of the second rules (rule basis II) warns against the use of this value of the output variable, further the second effect of the said rule being that the resulting membership function $\mu_c(u)$ assumes the functional value 0 in respect of such values of u for which the membership function $\mu_c^-(u)$ assumes the functional value of 1 which means that the second rules (rule basis II) warn against the use of this value of the output variable in the maximum possible degree 1, further the third effect of the said rule being that, proceeding from the given value of u and the same functional value $\mu_c^+(u)$, the functional value of the resulting membership function $\mu_c(u)$ tends to decrease as the functional value of $\mu_c^-(u)$ increases, that is, the second rules (rule basis II) warn to an increased degree against the use of the value of the output variable.

2. System in accordance with claim 1, characterised in that the resulting membership functions $\mu_e(u)$ or $\mu_e(u_1)$, $\mu_e(u_2), \ldots \mu_e(u_s)$ are conducted to further fuzzy units for use in the same.

3. System in accordance with claims 1 or 2, characterised in that the hyperinference procedure generates the functional values $\mu_e(u)=\mu_e^+(u)$ in respect of all values of the output variable u to which $\mu_e^-(u)=0$ applies and the functional values $\mu_e(u)=0$ for all other values of the output variable u.

4. System in accordance with claims 1 or 2, characterised in that the hyperinference procedure generates the functional values $\mu_e(u)=\mu_e^+(u)$ in respect of all values of the output variable u to which $\mu_e^+(u) \geq \mu_e^-(u)$ applies and the functional values $\mu_e(u)=0$ for all other values of the output variable u.

5. System in accordance with claims 1 or 2, characterised in that the hyperinference procedure functions in accordance with the rule $\mu_e(u)=\mu_e^+(u) \char94 ] \mu_e^-(u)$ or a logically equivalent rule, so interpreted that in this rule the functional values of functions $\mu_e^+(u)$ and $\mu_e^-(u)$ are to be used and evaluated in accordance with the arithmetic rules defined for fuzzy operators "^" and "]", whereby different variants result in respect of this hyperinference procedure in as far as varying definitions exist for the fuzzy operators.

6. System in accordance with claim 5, characterised in that the hyperinference procedure in a first procedural stage transforms the membership functions $\mu_e^+(u)$ and $\mu_e^-(u)$ into membership functions $k^+(\mu_e^+(u))$ and $k^-(\mu_e^-(u))$ and in that the second stage of the hyperinference procedure corresponds to the claim 5.

7. System in accordance with claim 6, characterised in that for transformation functions $k^+(u)$ and $k^-(u)$ are used which increase monotonically in respect of $\mu \geq 0$, which in $\mu=0$ assume the functional value of 0 and which assume the functional value of 1 in a finite value of $\mu$ or only asymptotically.

8. System in accordance with claim 7, characterised in that the hyperdefuzzification procedure breaks up the membership function $\mu_e(u)$ into partial functions $\mu_1(u)$, $\mu_2(u), \text{ - - - }, \mu_r(u)$ in accordance with rule $\mu_i(u)=\mu_e(u)$ in respect of $u \in [c_i, d_i]$ and $\mu_i(u)=0$ for $u \notin [c_i, d_i]$, in which case the intervals $[c_i, d_i]$ are formed according to the rule that the function $\mu_e(u)$ assumes a preselected value $p_i \geq 0$ at interval limits $c_i$ and $d_i$ and greater values within the interval, in which case each partial function is then defuzzified separately and the resulting values $\mu_j$ are employed for determining the final output-variable value u(e) of the fuzzy unit.

9. System in accordance with claim 8, characterised in that the hyperdefuzzification procedure allocates a weighting factor $g_i$ to each value $u_i$ and determines the value $u_i$ with the greatest weighting factor as the final value of the output variable, while—where maximum weighting factors result of equal size—one of the associated values is selected as the value of the output variable.

10. System in accordance with claim 9, characterised in that to each value $u_i$, the weighting factor $g_j$ is formed as a function of the value $F_i$ of the area located under the functional graph of partial function $\mu_i(u)$ in respect of positive values or as a function of the height $h_i$ of the area centre of gravity $S_i$ of these areas above the coordinate axis $\mu=0$, or as a function of the maximum functional value $\mu_{i,max}$ of the partial function $\mu_i(u)$ or as a function of the widths $b_{i,L}$ and $b_{i,R}$ of intervals $[d_{i-1}, c_i]$ and $[d_i, c_{i+1}]$ left or right of the interval $[c_i, d_i]$ in which $\mu_i(u)=0$ applies, or as a function of several of the variables $F_i$, $h_i$, $\mu_{i,max}$ and $b_{i,L}$ as well as $b_{i,R}$, in which case the resulting weighting factor $g_j$ will increase as the respective values of $F_i$, $h_i$, $\mu_{i,max}$ or $b_{i,L}$ or $b_{i,R}$ rise.

11. System in accordance with claims 9 or 10, characterised in that, in a first processing stage the value $u_j$ is determined with the largest weighting factor and that in a second processing stage the final value of the output variable $u(e)$ is formed by shifting $u_j$ within the interval $[c_j, d_j]$, formed in other words by applying a rule $u(e)=u_j+\Delta_j$ with $c_j \leq u_j+\Delta_j \leq d_j$.

12. System in accordance with claim 11, characterised in that the resulting shift $\Delta_j$ according to $\Delta_j=\Sigma\Delta_{ji}$ with $i \neq j$ is composed of partial amounts $\Delta_{ji}$ whose prefix signs correspond to the prefix sign of $u_i-u_j$ and whose absolute values increase as $g_i$, $F_i$, $h_i$ and $u_{i,max}$ rise in value, and whose absolute values decrease as the value of $g_j$, $F_j$, $h_j$ and $\mu_{j,max}$ and $|u_i-u_j|$ increase or in that the resulting shift is dependent solely or additionally on the values $c_j$, $\mu(c_j)$, $d_j$ and $u(d_j)$.

13. System in accordance with claim 12, characterised in that the hyperdefuzzification procedure transforms the function $\mu_e(u)$ into a function $k(\mu_e(u))$ during a first processing stage and in that the second stage of the hyperdefuzzification procedure corresponds to claim 12.

14. System in accordance with claim 13, characterised in that use is made for the transformation process of a function $k(\mu)$ which reveals monotic rise in respect of $\mu \geq 0$, such function assuming the functional value of 0 in $\mu=0$ and the functional value of 1 in a finite value $\mu$ or only asymptotically.

15. Fuzzy unit for implementing the system in accordance with claim 14, characterised in that it contains standard microprocessors and memory modules on the hardware side and comprises two subprograms on the software side for sequential or parallel processing of the first set of rules (rule basis I) and second set of rules (rule basis II) as well as consisting of two further subprograms for implementing the hyperinference procedure and the hyperdefuzzification procedure.

16. Fuzzy unit for implementing the system in accordance with claim 14, characterised in that it contains partial units on the hardware side consisting of standard microprocessors and memory modules, special fuzzy chips, artificial neural networks, customised circuits or optical components, in which case the first two partial units are connected in parallel for parallel processing of the first set of rules (rule basis I) and second set of rules (rule basis II) and that the other partial units are connected downstream from this for the purpose of implementing the hyperinference procedure and hyperdefuzzification procedure.

17. System in accordance with claim 15 or 16, characterised in that it has conventional single-line fuzzy controllers for determining the membership function $\mu_e^+(u)$ by processing the positive rules and for determining the membership function $\mu_e^-(u)$ by processing the negative rules in addition to one or more sub-units linked to these for determining membership function $\mu_e(u)$ as well as for implementing the hyperdefuzzification process.

18. Application of the system in accordance with claim 14, for determining the parameters of a non-linear performance-characteristics controller for control functions, characterised in that—proceeding from a fuzzy unit in accordance with claim 14—the parameters of a non-linear performance-characteristics controller are determined by an off line procedure in such a way that this has identical or approximately the same input/output behaviour pattern as the aforementioned fuzzy unit.

19. System in accordance with claim 18, characterised in that the behaviour pattern of the fuzzy unit is approximated by a piece-by-piece affine facet function and that this is evaluated on digital or analog lines.

20. Application of the system in accordance with claim 14 for the introduction of a dead zone for the output variable of a fuzzy controller, characterised in that, with the aid of prohibitive rules, provision is made to ensure that the fuzzy controller ceases to react to minor deviations in the event of the control system being located almost in the steady position.

21. Application of the system in accordance with claim 14 for generating prohibitive bands for the output variable of a fuzzy controller, e.g. in the interest of protecting a multistage actuator connected downstream as a means of preventing frequent switchover, characterised in that provision is made by the prohibitive rules to ensure that the value of the output variable on the fuzzy controller does not assume any values in close proximity to the switchover thresholds.

22. Application of the system in accordance with claim 14 for constructing a fuzzy controller designed to protect the actuator or system, characterised in that provision is made for measurable variables governing strain imposed on the actuator or system, e.g. the temperature or an algorithm which carries out time-weighted integration of the actuating variables supplied in the past by the values of the actuator or loaded on to the system, and in which prohibitive rules are employed to warn against such output-variable values u on the controller liable to impose unacceptable strain on the actuator or plant.

23. Application of the system in accordance with claim 14 for the prevention of undesirable vibrations on the plant when applying pulse-frequency modulation, characterised in that prohibitive rules provide warning against such values u of the output variable on the fuzzy controller causing undesirable pulse frequencies.

24. Application of the system in accordance with claim 14 for vibration absorption, characterised in that determination first proceeds off line—e.g. by conducting an eigenvalue analysis or on experimental lines—to find out what undesirable vibrations are apt to occur on the control system and what frequencies these vibrations have and then to establish on line—e.g. by conducting a correlation analysis in respect of each potential value u of the output variable currently due to be administered—to what extent this value causes increase in vibrational excitation in connection with the behaviour pattern of the output variable previously administered, and in which a prohibitive rule is then established which increasingly warns against the use of a value u as this degree of excitation rises.

25. Application of the system in accordance with claim 14 for the purpose of system supervision, characterised in that, with the aid of positive and negative rules, the presence or absence of system conditions u is indicated which are relevant for taking action at a higher process control level, e.g. by triggering alarms, where positive rules provide criteria indicating the extent to which such conditions exist, whereas negative rules indicate to what degree the conditions are not given.

26. Application of the system in accordance with claim 14 for evaluating the aggregate quality u of complex processes according to scale $u_{min} \leq u \leq u_{max}$, characterised in that positive rules supply criteria for every possible aggregate quality u for assessing the degree to which this quality represents an adequate evaluation as applied to the relevant situation and negative rules supply criteria for the extent to which it is inadequate, whilst a final aggregate quality is determined from this by means of hyperinference and hyperdefuzzification.

27. Application of the system in accordance with one of the claims 1–14 for creating a fuzzy measuring system consisting of one or more sensors and a fuzzy unit for processing the measured values, characterised in that current measured values as well as measured values delivered previously by the sensor or sensors in the past are conducted to the fuzzy unit in the form of input variables, and that, for each potential value u supplied by processing the measured values, positive and negative rules can be made to establish to what degree this value is deemed to be supported or discarded by the previously measured values, on the basis of which unambiguous, purposefully processed measuring results are determined by hyperinference and hyperdefuzzification.

* * * * *

UNITED STATES PATENT AND TRADEMARK OFFICE
CERTIFICATE OF CORRECTION

PATENT NO. : 5,826,251
DATED : October 20, 1998
INVENTOR(S) : Harro Kiendl

It is certified that error appears in the above-identified patent and that said Letters Patent is hereby corrected as shown below:

On the title page, item:

Item [22], Page 1, change "PCT Filed: Mar. 5, 1995" to --PCT Filed: Mar. 5, 1994--.

Item [30], Page 1, change "Mar. 13, 1994" to --Mar. 13, 1993--.

Column 1, line 9, change "1994" to --1993--.

Signed and Sealed this

Twentieth Day of July, 1999

Attest:

Attesting Officer

Q. TODD DICKINSON

Acting Commissioner of Patents and Trademarks